April 15, 1958  M. C. WILLS ET AL  2,830,511
ROLLER ATTACHMENT FOR TRACTORS
Filed Feb. 8, 1954  3 Sheets-Sheet 1
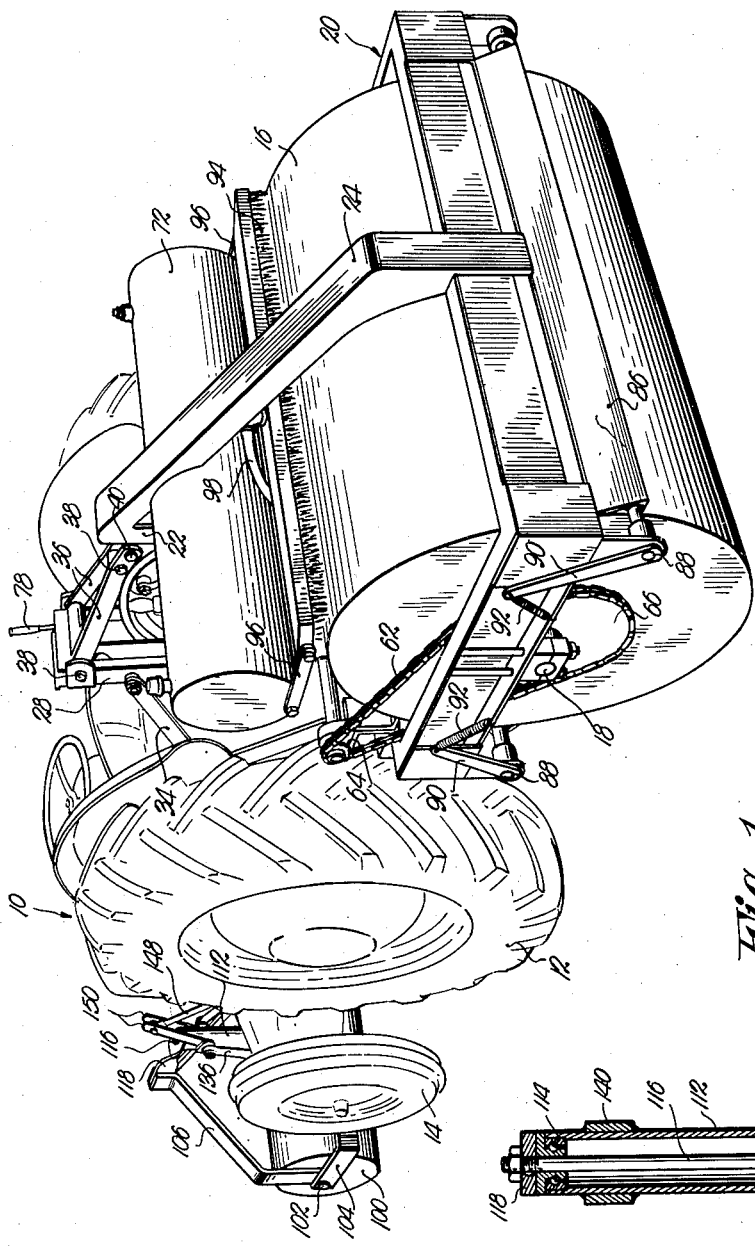
INVENTORS.
Marion C. Wills
Wayne J. Wills
BY
ATTORNEY.

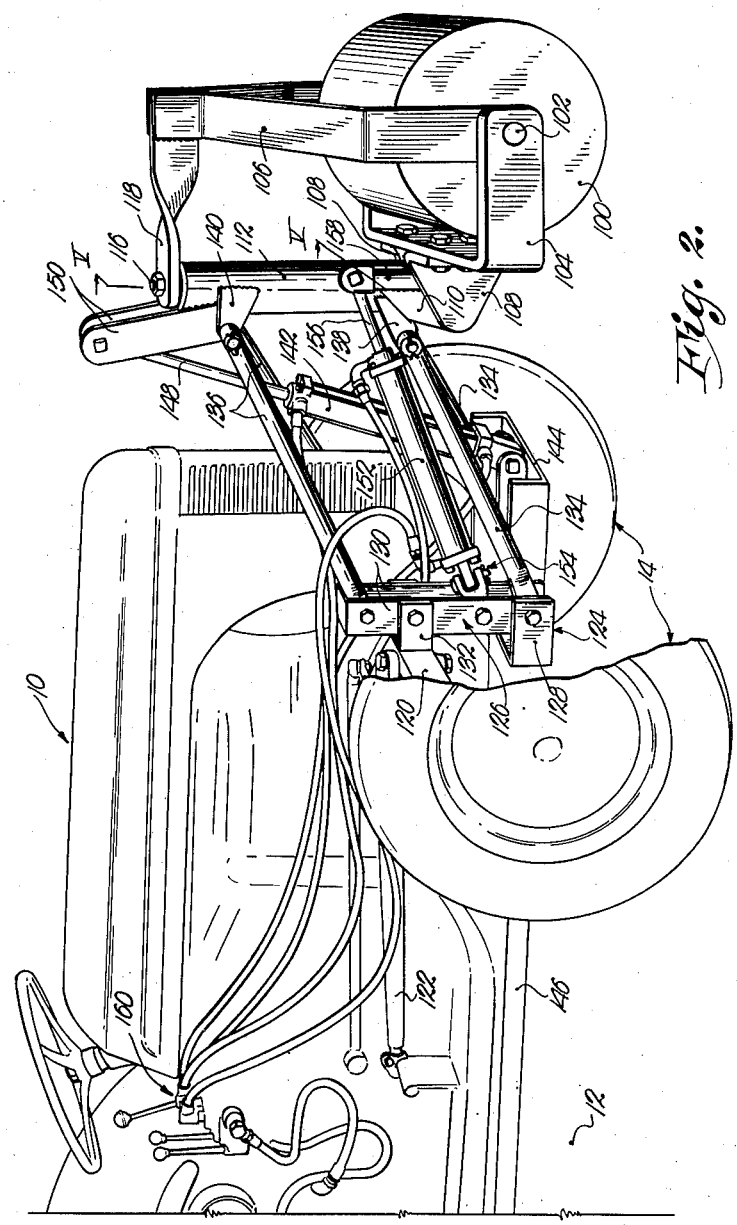

April 15, 1958
M. C. WILLS ET AL
2,830,511
ROLLER ATTACHMENT FOR TRACTORS
Filed Feb. 8, 1954
3 Sheets-Sheet 3
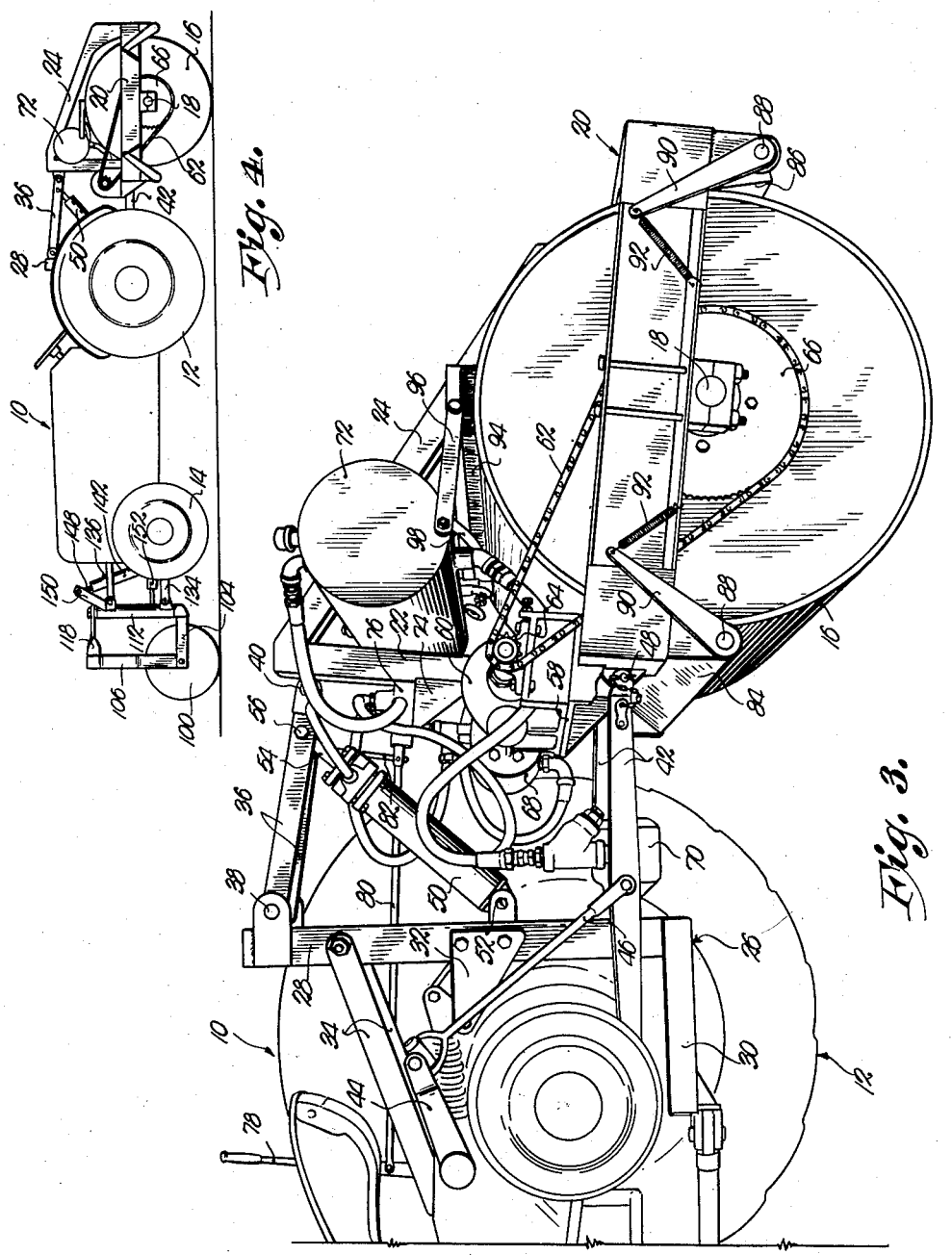
INVENTORS.
Marion C. Wills
Wayne J. Wills
BY
ATTORNEY.

United States Patent Office 2,830,511
Patented Apr. 15, 1958

2,830,511

ROLLER ATTACHMENT FOR TRACTORS

Marion C. Wills and Wayne J. Wills, Topeka, Kans., assignors to Shawnee Manufacturing Company, Inc., Topeka, Kans., a corporation of Kansas Application February 8, 1954, Serial No. 408,807

6 Claims. (Cl. 94—50)

This invention relates to roller structure and particularly to that class of implements for pressing or smoothing by pressure so as to compact garden lawns, paths, macadam roads and other ground surfaces.

It is the most important object of the present invention to provide a roller for crushing, squeezing and indenting by pressure and adapted particularly for mounting upon wheeled vehicles.

Another object of this invention is to provide a roller assembly for tractors including novel structural features having a power unit for raising the roller and holding the same in an elevated position supported by the tractor, or for lowering the roller and holding the rear wheels of the tractor off the ground so that the weight of the latter is added to the weight of the roller during use of the implement.

Another important object is to provide a roller assembly wherein the entire tractor may be elevated through use of a front and a rear roller, both of which is capable of supporting the tractor and thereby utilizing the weight thereof.

A further object is to provide a roller assembly wherein the rear roller has a prime mover operably coupled therewith and the front roller is provided with extensible power means permitting steering thereof when all of the wheels of the tractor are elevated off the ground.

An important object of the present invention is to provide in roller structure, novel means for swingably attaching the frame thereof to the tractor, together with a double-acting hydraulic ram operable to either hold the roller elevated and supported by the tractor or to hold the tractor elevated and supported by the roller.

Other objects include many important details of construction, all of which will be made clear as the following specification progresses.

In the drawings:

Figure 1 is a rear perspective view of a roller attachment for tractors made pursuant to the present invention.

Fig. 2 is a front perspective view thereof, parts being broken away for clearness.

Fig. 3 is a side perspective view showing the rear roller attachment, one of the rear wheels of the tractor being removed for clearness.

Fig. 4 is a side elevational view on a reduced scale showing the roller attachment as the same appears in operative use with the tractor elevated entirely off the ground; and Fig. 5 is a fragmentary, detailed, cross-sectional view taken on line V—V of Fig. 2.

The attachment about to be described is adapted for mounting upon virtually any wheeled vehicle and particularly, upon a tractor broadly designated by the numeral 10, having rear wheels 12 and front wheels 14 in the usual manner.

The rear roller attachment includes an elongated, cylindrical roller 16 mounted for rotation on a horizontal axis through the medium of an axle 18, carried by a frame that includes a continuous polygonal section 20 that surrounds the roller 16. An upstanding member 22, rigid to the framework 20 at the front thereof, is joined to the rearmost beam of the continuous frame 20 by an inclined member 24 overlying the roller 16.

Framework broadly designated by the numeral 26 and releasably attached to the tractor 10 between the rear wheels 12 thereof, includes an upstanding member 28 resting on an underlying plate 30 connected to the tractor 10 in any suitable manner (not shown). Side plates 32 and braces 34 connect the member 28 intermediate the ends thereof with the tractor 10. A pair of links 36 pivotally interconnect the members 22 and 28 adjacent the uppermost ends thereof for swinging movement on horizontal axes 38 and 40 respectively.

The frame 20 is also pivotally connected to the tractor 10 through the medium of a pair of drawbars 42 that are swingable vertically in the usual manner by operation of the power lift mechanism of the tractor 10. To this end, there is provided a pair of cranks, one only of which is shown in Fig. 3 and designated by numeral 44. Cranks 44 are connected with the drawbars 42 by links 46, but in operation of the roller assembly of the present invention, it is unnecessary to utilize the power lift means for swinging the cranks 44 on their horizontal axes. Nevertheless, the drawbars 42 are pivotally connected at their rearmost ends to the framework 20 by means of pivot pins, one of which is shown in Fig. 3 and designated by the numeral 48.

A double-acting, hydraulic piston and cylinder assembly includes a cylinder 50 between the drawbars 42 and the links 36 and pivotally connected to the member 28 for swinging movement on horizontal axis 52. The reciprocable piston (not shown) within the cylinder 50, has its stem 54 extending between the links 36 and pivotally connected thereto adjacent the pivot 40 as at 56.

A shelf 58 on the framework 20, carries a gear reduction unit 60 that is operably coupled with the roller 16 through a continuous chain 62 passing over gears 64 and 66 on unit 60 and roller 16 respectively. Shelf 58 also carries a hydraulic motor 68 that is operably connected with the gear reduction unit 60.

Hydraulic fluid is supplied to the cylinder 50 and to the motor 68 through a pump 70 driven by the power take-off of the tractor 10. Hydraulic fluid is supplied to the pump 70 from a tank 72 mounted above the roller 16 and attached to the frame members 22 and 24.

A second shelf 74 carried by the member 22 above the shelf 58, mounts control valving 76 that is in turn actuated manually by a lever 78 having a connecting link 80 and by a second control lever 82.

The roller 16 is equipped with front and rear cleaner bars 84 and 86 respectively, swingably mounted on the frame section 20 therebelow through the medium of shafts 88. Cranks 90 rigid to the shafts 88 are connected with the frame section 20 by springs 92 to hold the bars 84 and 86 yieldably biased in scraping engagement with the roller 16.

A watered mat 92 resting upon the roller 16 is pivotally secured to the tank 72 by links 96 and receives its supply of liquid from the tank 72 by means of a valved conduit 98, it being understood that tank 72 is provided with a partition (not shown) sub-dividing the same into a water compartment for the mat 94 and a second compartment for storage of hydraulic fluid which supplies the pump 70. Conduits are shown in Fig. 3 of the drawings operably interconnecting the tank 72, the valve means 76, the cylinder 50, the pump 70 and the motor 68, and since such means of operable interconnection is well understood by those skilled in this field, detailed description thereof is unnecessary.

A front roller 100 is mounted for rotation on a horizontal axle 102 that is in turn carried by a horizontal, U-shaped frame 104 and a vertical, U-shaped frame 106. A pair of spaced, rearwardly extending brackets 108 rigid to the frame 104 is interconnected by a crosspiece 110. An upright tube 112 extending upwardly from the crosspiece 110, contains spaced bearings 114, the lowermost of which is attached to the crosspiece 110. Bearings 114 receive a vertical pin 116 that traverses the cross member 110 and passes through a link 118 extending rearwardly from the uppermost end of frame member 106 to which it is rigidly secured.

Tractor 10 is provided with a front crossbeam 120 extending entirely thereacross between the engine and the radiator of the tractor 10. Crossbeam 120 is provided to mount the front wheels 14 of the tractor 10 and is braced by arms, one of which is shown in Fig. 2 and designated by the numeral 122.

A U-shaped frame, broadly designated by the numeral 124, has a pair of uprights 126 rigidly secured thereto and reinforced by straps 128. The uprights or legs 126 of the U-shaped frame 124, one only of which is shown in Fig. 2, embrace the front of the tractor and each comprise a pair of spaced-apart, parallel, elongated plates 130. Each upright 126 is connected directly to the crossbeam 120 by a U-shaped bracket 132. Each upright 126 pivotally receives a lower arm 134 and an upper arm 136 for swinging movement on spaced, horizontal axes. Arms 134 converge as the tube 112 is approached and are pivotally connected thereto by straps 138. Arms 136 likewise converge toward a point of pivotal connection with the tube 112 by means of straps 140.

A hydraulic ram for raising and lowering the roller 100, includes a cylinder 142 pivotally connected at its lowermost end to a plate 144 that is in turn joined to frame 124 and to the plate 30 by an A-frame 146 underlying the tractor 10.

Cylinder 142 is provided with a reciprocable piston (not shown) having a stem 148 extending upwardly from the cylinder 142 and pivotally connected to a pair of upstanding brackets 150 therebetween, brackets 150 being rigid to the tube 112. Cylinder 142 is disposed substantially on the center line of the tractor 10 between the arms 134, and a second cylinder 152 to one side of the cylinder 142, has pivotal connection with one of the uprights 126 between the plates 130 thereof and above the proximal arm 134 by universal joint 154.

Cylinder 152 is equipped with a reciprocable piston (not shown) that has its stem 156 pivotally connected to the frame 104 by means of an upstanding post 158 rigid to the proximal bracket 108 and the crossbeam 110.

The double-acting piston and cylinder assemblies that includes cylinders 142 and 152, are operably connected with the pump 70 through a manually operable valving assembly 160 and suitable conduits as illustrated in Fig. 2.

It is manifest that raising and lowering of the rollers 16 and 100, forward or rearward movement thereof, and steering of the roller 100 when the tractor 10 is raised off the ground as shown in Fig. 4, is under the control of the operator of the tractor 10 seated thereon through use of the valving means 76 and 160. When fluid is directed to the lowermost end of the cylinder 50, stem 54 is extended to raise the roller 16 off the ground, and similarly, when fluid is directed to the lowermost end of the cylinder 142, stem 148 is extended to elevate the roller 100 off the ground. In that event, both rollers 16 and 100 are carried by the tractor 10 and transported thereby through normal operation of the tractor.

When it is desired to place the roller 15 in use, fluid is directed to the uppermost end of the cylinder 50 to retract stem 54, thereby forcing the roller 16 against the ground and raising the rear wheels 12 of the tractor 10 off the ground. In that instance, the rear end of the tractor is entirely supported by roller 16 and the weight of the tractor is utilized during rolling operations.

If it is desired to also use the roller 100, it is but necessary to direct fluid to the upper end of cylinder 142, thereby retracting stem 148 until roller 100 engages the ground and until the front wheels 14 are elevated. Under such conditions it is necessary to utilize the steering means which includes cylinder 152 inasmuch as the elevated front wheels 14 can no longer be used to guide the tractor 10.

Manifestly, as fluid is directed to opposite ends of the cylinder 152, thereby extending and retracting the stem 156, roller 100 will be swung on the vertical axis of pin 116.

In the same connection, when the rear wheels 12 are off the ground, the assembly must be advanced and reversed through use of the hydraulic motor 68, gear reduction unit 60 and chain drive 62.

It is clear from the foregoing description that as the stem 54 is extended upwardly, drawbars 42 will swing on their innermost horizontal axes and links 36 will likewise swing on their pivotal connection 38 with the frame member 28. Links 36 and drawbars 42, by virtue of their pivotal connections 40 and 48 with the rollers 16 present therefore, a modified, parallel linkage arrangement that is under sole control of the hydraulic ram which includes cylinder 50 and stem 54.

By the same token, parallel linkage arrangement that includes the four arms 134 and 136, permits free vertical movement of the roller 100 under control of the cylinder 142 pivotally connected with the tractor 10 and the stem 148 pivotally connected with the framework 104 and 106 of the roller 100 through tube 112 and brackets 150. Since the framework 104 and 106 are free to swing with respect to the tube 112 on the vertical axis of pin 116, reciprocable movement of the stem 156 provides adequate steering for the roller 100.

Having thus described the invention what is claimed as new and desired to be secured by Letters Patent is:

1. In combination with a tractor having front and rear wheels and a rearwardly extending, swingable drawbar; a front and a rear frame at corresponding ends of the tractor, there being an upright member on the front frame adjacent the tractor; a roller rotatably carried by each frame respectively, the front frame being rotatably mounted on a member for swinging movement about the vertical axis of the latter; structure above the drawbar for pivotally securing said rear frame to the tractor; means for pivotally attaching said rear frame to the drawbar; parallel linkage means pivotally connecting said member to the tractor for swinging movement of the front frame relative to the tractor on a horizontal axis; separate extensible means interconnecting said structure and the tractor and said member and the tractor respectively for independently swinging said frames relative to the tractor whereby both rollers may be swung from an elevated position downwardly to a position engaging the ground and supporting the tractor with all of its wheels off the ground; extensible power means interconnecting said front frame and the tractor for swinging the front frame about said vertical axis whereby the tractor may be steered while all of its wheels are off the ground; a prime mover on the tractor; and means operably coupling the prime mover with the rear roller for rotating the latter when it is in engagement with the ground.

2. The combination set forth in claim 1 wherein said extensible means interconnecting said structure and the tractor is disposed obliquely between the drawbar and the structure.

3. The combination set forth in claim 1 wherein said extensible means are double-acting hydraulic piston and cylinder assemblies.

4. The combination as set forth in claim 1 wherein there is provided a vertical pin secured to the front frame and said member is rotatably mounted on the pin in surrounding relationship thereto.

5. The combination as set forth in claim 1 wherein said parallel linkage means includes a pair of units disposed in vertical, spaced parallelism and each including a pair of outwardly converging links connected at their outermost ends to said member.

6. The combination as set forth in claim 5 wherein there is provided a pair of spaced, vertical bars secured to the tractor and wherein the innermost ends of the links of each of the units are pivotally secured to said bars.

References Cited in the file of this patent

UNITED STATES PATENTS

| | | |
|---|---|---|
| 1,375,185 | Seitor | Apr. 19, 1921 |
| 1,458,751 | Gailor | June 12, 1923 |
| 2,127,485 | Owens | Aug. 16, 1938 |
| 2,164,845 | Steed | July 4, 1939 |
| 2,243,251 | Gustafson | May 27, 1941 |
| 2,386,025 | Wills | Oct. 2, 1945 |